(No Model.)

G. O. SCHNELLER.
HOOK AND EYE.

No. 440,373. Patented Nov. 11, 1890.

Witnesses
J. H. Shumway
Lillian D. Kelsey

Geo. O. Schneller
Inventor
By Atty.
Earle Seymour

UNITED STATES PATENT OFFICE.

GEORGE O. SCHNELLER, OF ANSONIA, CONNECTICUT.

HOOK AND EYE.

SPECIFICATION forming part of Letters Patent No. 440,373, dated November 11, 1890.

Application filed March 24, 1890. Serial No. 345,108. (No model.)

*To all whom it may concern:*

Be it known that I, GEORGE O. SCHNELLER, of Ansonia, in the county of New Haven and State of Connecticut, have invented new Improvements in Hooks and Eyes; and I do hereby declare the following, when taken in connection with accompanying drawings and the letters of reference marked thereon, to be a full, clear, and exact description of the same, and which said drawings constitute part of this specification, and represent, in—

Figure 1:
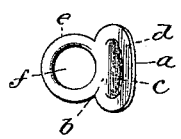
Figure 4:
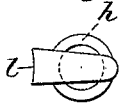
Figure 2:
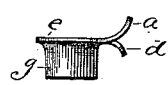
Figure 5:
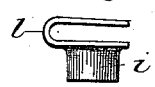
Figure 3:
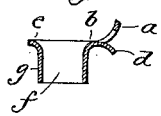
Figure 6:
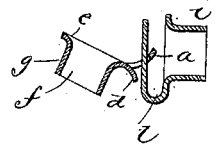
Figure 7:
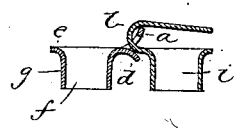
Figure 8:
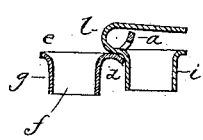
Figure 9:
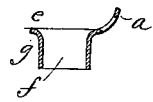
Figure 10:
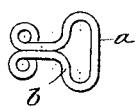
Figure 11:

Figure 1, a face view of the eye; Fig. 2, a side view of the same; Fig. 3, a longitudinal central section of the same; Fig. 4, a face view of the hook; Fig. 5, an edge view of the hook; Figs. 6, 7, and 8, longitudinal sections illustrating the engagement, disengagement, and operation of the hook and eye; Figs. 9, 10, and 11, modifications.

This invention relates to an improvement in hooks and eyes such as are employed for dress-fastenings.

In the use of hooks and eyes dependence is usually made upon the natural strain upon the parts when engaged to prevent accidental detachment, such accidental detachment frequently occurring when the strain upon the hooks and eyes is relaxed, so as to permit them to slide or move toward each other, the eye readily passing over the point of the hook. Various constructions of hook have been devised to make a spring-like engagement with the eye so as to prevent such accidental detachment, and in many cases the device is successful; but the construction of the hook to produce this result requires complicated machinery.

The object of my invention is a simple device by which accidental disengagement under a relaxed strain upon the parts may be avoided; and it consists in constructing the eye in the form of a loop, said loop having two parallel bars, one of which is the outer or engaging bar for the hook, the other or inner bar *b* being in the plane of the eye, the outer bar being turned upward from the plane of the eye and so that the rounded end of the hook may work against the inner edge of the inner bar of the loop as a cam, that when the strain is relaxed so as to permit the hook and eye to slide together the rounded end or bend of the hook will strike the inner bar and ride onto the surface of the body of the eye, so as to prevent the hook from being turned and so that the outer or upturned bar of the eye cannot escape from the open end of the hook.

In the best construction of the eye it is made from sheet metal and of a form substantially as seen in Fig. 1, the eye proper being of loop shape and composed of an outer bar *a* and an inner bar *b*, substantially parallel to each other and connected at their ends so as to form a loop-like opening *c*. This opening may be formed by cutting the metal upon that side next the bar *a* and across the ends, leaving the connection on the side of the bar *b*, and then the metal turned down to form a tongue *d* upon the under side of the eye.

The body *e* of the eye is made of any desirable shape and provided with any desirable means for attachment. As here represented, a hole *f* is punched through the body and the metal drawn downward to form an eyelet *g*, as an integral part of the eye, and by which it may be secured. The bar *a* of the eye proper is turned upward from the plane of the body of the eye and above the bar *b*, as seen in Figs. 2 and 3, so that the opening *c* of the loop stands above the plane of the eye and of the bar *b*. This completes the eye. The hook may be any of the common constructions of hooks adapted to be introduced into the eye, made from wire or sheet metal.

In the illustration Figs. 4 and 5 the hook is represented as made from sheet metal. The body *h*, like the body of the eye, is pierced and preferably so as to form an eyelet *i*, by which it may be secured. The metal extending from the body is bent, as at *l*, and returned over the body to form the hook.

The upward projection of the turned-up bar *a* of the eye above the plane of the body should be nearly the same or greater than the space within the bend *l* of the hook.

The hook and eye being attached to the respective parts to be connected, when engagement is desired the hook or eye—one or both—is turned out of its natural plane, as seen in Fig. 6, so that the open end of the hook may pass through the opening *c* of the eye upward and then turned down into the natural plane, as seen in Fig. 7. The hook and eye are drawn together, the bar $a$ passing into the bend of the hook. In this condition, as seen in Fig. 7, the lower portion of the bend of the hook stands in nearly the plane of the body of the eye and of the bar $b$, and so that as the two parts approach each other in that plane, as they will do under a relaxation of the strain, the rounded end of the hook will pass onto the face of the body of the eye under the bar $a$ and over the bar $b$, as seen in Fig. 8, the rounded end of the hook operating as a cam to throw it up onto the body of the hook. The rounded end striking the turned-down tongue $d$ of the eye insures this movement of the hook, and because the hook thus passes onto the body accidental detachment is impossible, notwithstanding the movement may be so great as to take the open end of the hook beyond the bar $a$. Consequently under the ordinary uses of the hook and eye accidental disengagement is impossible. Such disengagement can only be made by a reverse operation to that of engagement—that is to say, the hook and eye, while the bend is engaged with the bar $a$, as seen in Fig. 7, must be turned out of their natural plane and so that the bend may pass down through the opening in the loop, as seen in Fig. 6; otherwise disengagement is impossible.

The tongue $d$ may be omitted, as seen in Fig. 9—that is, the metal may be entirely removed if made from sheet metal—the hook operating against the rear edge of the opening in the loop—that is, the rear bar of the loop—substantially as before described.

I have represented the eye as made from sheet metal; but, it will be understood, it may be made from wire, as illustrated in Figs. 10 and 11, the wire being bent so as to form the outer bar $a$ and returned to form the other parallel bar $b$ of the loop, substantially the same as the two bars $a$ $b$ of the loop, before described, the outer bar $a$ being turned up, as before described, and so that the plane of the body and of the loop may hold substantially the same relation to the bend of the hook when engaged and in disengaging, as before described. I prefer, however, to make the eye from sheet metal, as requiring simpler machinery and a cheaper construction.

I do not claim, broadly, an eye for hooks and eyes having the hook-engaging part of the eye turned upward out of the plane of the body, as such, I am aware, is not new.

I claim—

1. The herein-described eye for hooks and eyes, consisting of a body having a loop projecting therefrom, the said loop composed of two substantially parallel bars connected at their ends, the outer or engaging bar $a$ of the loop turned upward from the plane of the other bar $b$, and the body of the eye, substantially as described, and whereby the said inner bar operates as a guard against the disengagement of the hook.

2. An eye for hooks and eyes, made from sheet metal, consisting of a body $e$, adapted for attachment to the part to be secured, a loop projecting therefrom, consisting of an outer bar $a$ and an inner bar $b$, substantially parallel to each other, and the outer bar $a$, turned up from the plane of the body and above the bar $b$, substantially as described.

3. An eye for hooks and eyes, made from sheet metal and consisting of a body having a loop projecting therefrom, composed of a bar $a$ and a bar $b$, substantially parallel to each other and connected at their ends to form the eye-opening $c$, the metal from the opening turned downward to form a tongue $d$ below the plane of the body of the eye, and the bar $a$, turned upward from the plane of the said bar $b$, substantially as described.

4. An eye for hooks and eyes, made from sheet metal and consisting of a body $e$, a loop composed of an outer bar $a$ and an inner bar $b$, the two bars connected at their ends to form the eye-opening $c$, the outer bar $a$ turned upward from the plane of the body, and an eyelet $g$, made integral with the body, substantially as described, the said eyelet serving as the means for attachment of the eye.

GEORGE O. SCHNELLER.

Witnesses:
NELLIE R. FRENCH,
FRED C. EARLE.